United States Patent
Yamashita (10) Patent No.: US 7,343,802 B2
(45) Date of Patent: Mar. 18, 2008

(54) DYNAMIC-QUANTITY SENSOR

(75) Inventor: Muneharu Yamashita, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/468,796

(22) Filed: Aug. 31, 2006

(65) Prior Publication Data

US 2007/0063617 A1 Mar. 22, 2007

Related U.S. Application Data

(63) Continuation of application No. PCT/JP2005/001498, filed on Feb. 2, 2005.

(30) Foreign Application Priority Data

Mar. 30, 2004 (JP) ............... 2004-100725

(51) Int. Cl.
  *G01P 15/09* (2006.01)
  *G01C 19/00* (2006.01)
(52) U.S. Cl. .............. 73/514.34; 73/504.12
(58) Field of Classification Search ........... 73/514.34, 73/514.29, 514.16, 514.33, 504.04, 504.12; 310/317–319, 311, 329, 332
See application file for complete search history.

(56) References Cited

U.S. PATENT DOCUMENTS 4,060,772 A * 11/1977 Yamada et al. ........ 331/116 FE
4,544,897 A * 10/1985 Ishikawa ................ 331/116 R
6,049,157 A * 4/2000 Kobayashi ............. 310/316.01
6,134,962 A * 10/2000 Sugitani .................. 73/504.16
6,588,276 B2 7/2003 Yamashita
6,763,726 B2 * 7/2004 Yamashita ..................... 73/778
7,109,636 B2 * 9/2006 Yamashita ............. 310/316.01
2002/0125792 A1 9/2002 Tabota
2003/0164696 A1 9/2003 Yamashita

FOREIGN PATENT DOCUMENTS

| JP | 2002-122614 A | 4/2002 |
| JP | 2002-243757 A | 8/2002 |
| JP | 2003-254991 | 9/2003 |
| JP | 2005-223508 | * 8/2005 |

OTHER PUBLICATIONS

International Search Report issued in the corresponding International Application No. PCT/JP2005/001498, mailed on Apr. 26, 2005.

* cited by examiner

*Primary Examiner*—Helen Kwok
(74) *Attorney, Agent, or Firm*—Keating & Bennett, LLP (57) ABSTRACT

A piezoelectric-vibrator series circuit including two series-connected piezoelectric vibrators to which stresses induced by a dynamic quantity are applied in opposite directions is used, and a Colpitts oscillator circuit is defined by the piezoelectric-vibrator series circuit and an amplifier circuit/load impedance circuit. A phase-difference-to-voltage converter circuit is provided to convert a phase difference between an output voltage of the oscillator circuit and a voltage at a piezoelectric-vibrator series node of the piezoelectric-vibrator series circuit into a voltage signal.

7 Claims, 9 Drawing Sheets

DYNAMIC-QUANTITY SENSOR

BACKGROUND OF THE INVENTION

1. Field of the Invention

The present invention relates to a dynamic-quantity sensor for sensing a dynamic quantity, such as acceleration, angular acceleration, angular velocity, or load.

2. Description of the Related Art

The present applicant has filed Japanese Unexamined Patent Application Publication 2002-243757 (Patent Document 1) and Japanese Unexamined Patent Application Publication 2003-254991 (Patent Document 2) regarding a dynamic-quantity sensor with piezoelectric vibrators.

Figure 13:
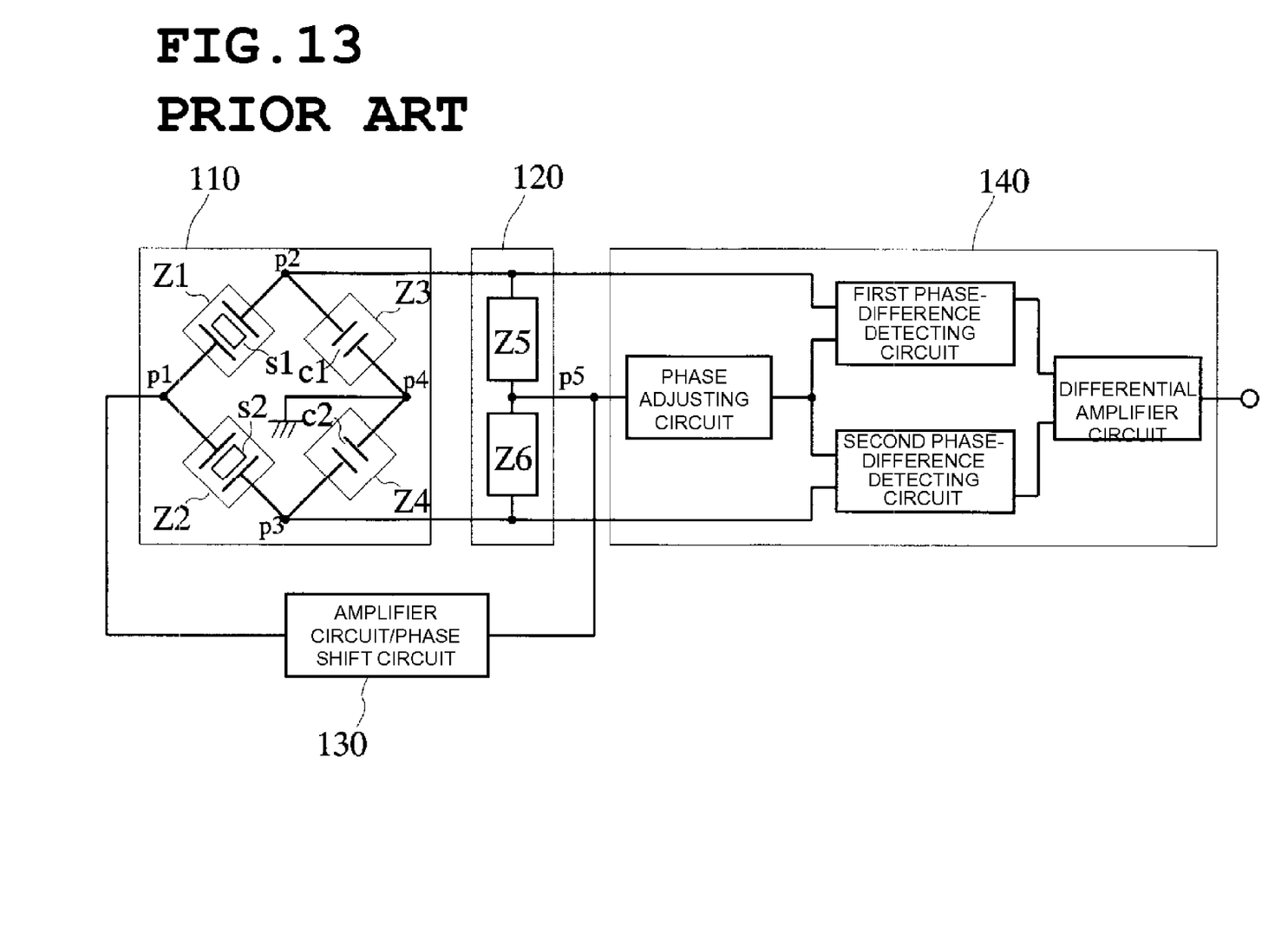
FIG. 13 is a diagram of the configuration of a dynamic-quantity sensor in Patent Document 1.

The configuration of an acceleration sensor in Patent Document 1 is shown in FIG. 13 herein. As shown in FIG. 13, a bridge circuit 110 includes two piezoelectric vibrators S1 and S2 to which stresses induced by acceleration are applied in opposite directions, and capacitors C1 and C2. A voltage-dividing impedance circuit 120 is disposed between nodes p2 and p3. A signal at a voltage division point p5 of the voltage-dividing impedance circuit 120 is fed back to a node p1 by a feedback signal processing circuit 130. In this manner, an oscillator circuit is provided. An oscillation-output phase difference between the nodes p2 and p3 is detected by a phase-difference signal processing circuit 140, and the phase difference is output as an acceleration detection signal.

Figure 14:
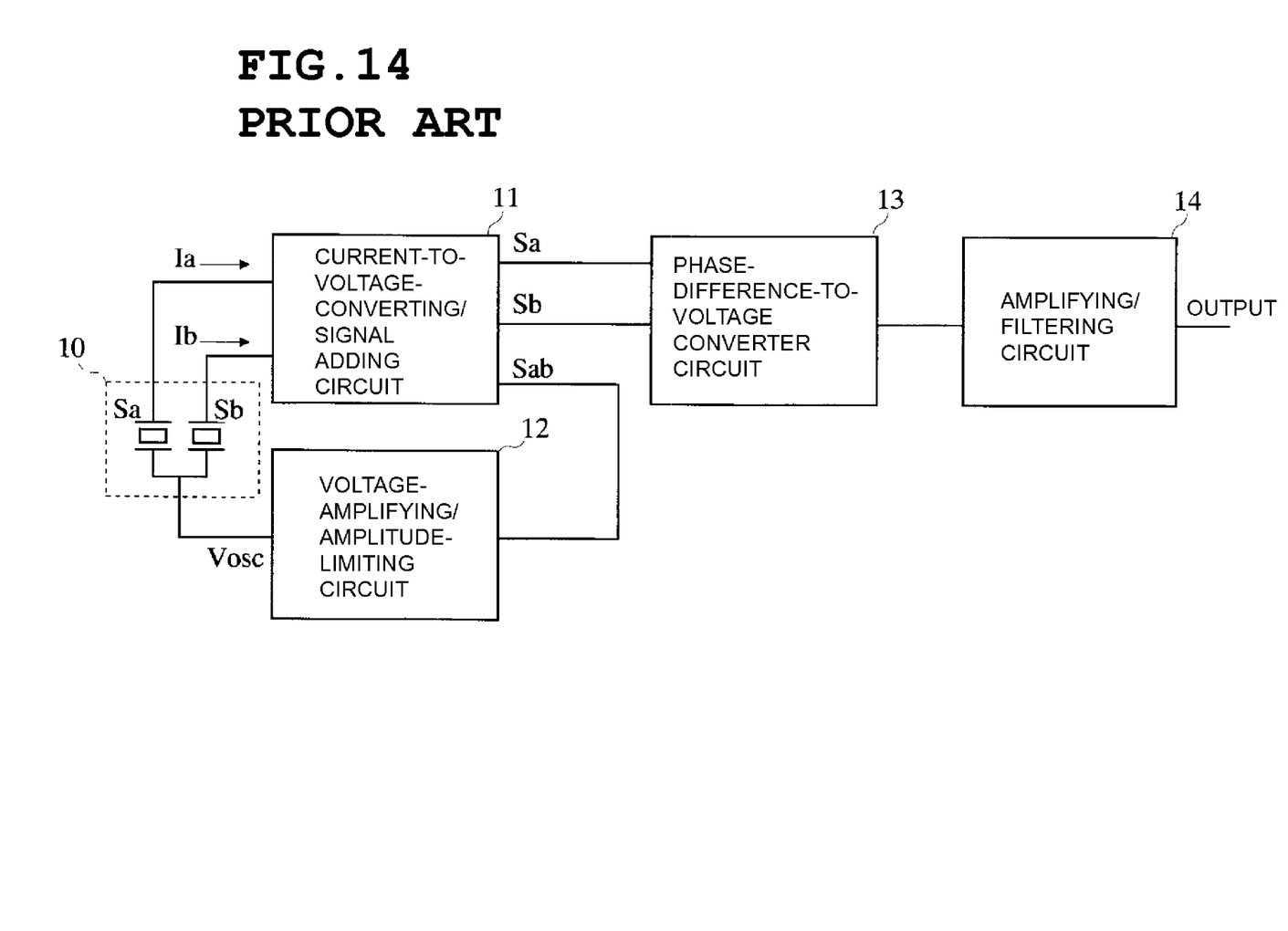
FIG. 14 is a diagram of the configuration of a dynamic-quantity sensor in Patent Document 2.

The configuration of a dynamic-quantity sensor in Patent Document 2 is shown in FIG. 14 herein. Two piezoelectric vibrators Sa and Sb are arranged so that stresses induced by a dynamic quantity, such as acceleration, are applied thereto in opposite directions. A current-to-voltage-converting/signal adding circuit 11 converts current signals flowing through the two piezoelectric vibrators Sa and Sb into voltage signals. A voltage-amplifying/amplitude-limiting circuit 12 amplifies a combined signal Sab of the two voltage signals to generate a voltage signal Vosc, which is in phase with the current signals, and positively feeds back the voltage signal Vosc to cause oscillation. A phase-difference-to-voltage converter circuit 13 generates a voltage signal in proportion to a phase difference between the voltage-converted signals Sa and Sb. An amplifying/filtering circuit 14 performs direct-current (DC) amplification of the voltage signal and removes unnecessary frequency components from the voltage signal.

As uses and requirements of dynamic-quantity sensors for sensing a dynamic quantity, such as acceleration, have increased and become more varied, it has been strongly demanded to reduce the cost thereof. However, the acceleration sensor in Patent Document 1 requires many components since two pairs of circuits are required to detect a phase difference, and an adding circuit (averaging circuit) including a voltage-dividing impedance circuit is necessary to determine the oscillation frequency. It is thus difficult to reduce the size and cost of such an acceleration sensor. Similarly, the dynamic-quantity sensor in Patent Document 2 requires relatively large-scale circuits, such as the current-to-voltage-converting/signal adding circuit and the voltage-amplifying/amplitude-limiting circuit, for driving two piezoelectric vibrators in parallel with each other, and it is thus difficult to reduce the size and cost of such a dynamic-quantity sensor.

SUMMARY OF THE INVENTION

To overcome the problems described above, preferred embodiments of the present invention provide a dynamic-quantity sensor whose size and cost are reduced as compared to a known dynamic-quantity sensor by improving the circuit configuration for dynamic-quantity sensing.

A dynamic-quantity sensor according to a preferred embodiment of the present invention includes a piezoelectric-vibrator series circuit including two series-connected piezoelectric vibrators to which stresses induced by a dynamic quantity are applied in opposite directions, a Colpitts oscillator circuit defined by connecting an amplifier circuit and a load impedance circuit to the piezoelectric-vibrator series circuit, and a phase-difference-to-voltage converter circuit for converting a phase difference between a voltage at a series node between the piezoelectric vibrators of the piezoelectric-vibrator series circuit and an output voltage of the oscillator circuit into a voltage.

In the dynamic-quantity sensor according to this preferred embodiment, the oscillator circuit is preferably defined by connecting a first capacitor between a first end of the piezoelectric-vibrator series circuit and ground, connecting a second capacitor between a second end of the piezoelectric-vibrator series circuit and the ground, connecting an input portion of the amplifier circuit to the first end of the piezoelectric-vibrator series circuit, and connecting an output-side resistor between an output portion of the amplifier circuit and the second end of the piezoelectric-vibrator series circuit, and an impedance of the output-side resistor is greater than an output impedance of the amplifier circuit, and the impedance of the output-side resistor and a capacitance of the second capacitor are determined so that the product of the impedance of the output-side resistor and the capacitance of the second capacitor is greater than the value $1/(2\pi f)$, where f is an oscillation frequency of the oscillator circuit.

In the dynamic-quantity sensor according to this preferred embodiment, a series circuit including an input-side resistor and a third capacitor is preferably connected in parallel with the first capacitor, the capacitances of the first and second capacitors are set to be substantially equal to each other, and the impedances of the output-side resistor and the input-side resistor are set to be substantially equal to each other.

In the dynamic-quantity sensor according to this preferred embodiment, a series resistor is preferably disposed in series with the first capacitor between the first end of the piezoelectric-vibrator series circuit and the ground.

According to preferred embodiments of the present invention, instead of driving two piezoelectric vibrators in parallel with each other, as in Patent Documents 1 and 2, two series-connected piezoelectric vibrators are driven in series with each other. The entire oscillator circuit including the piezoelectric-vibrator series circuit includes only a few components, thereby reducing the size and cost thereof. That is, an adder circuit (an averaging circuit using a voltage-dividing impedance) is not required to control the oscillation frequency. Since the difference between characteristic voltages, induced by acceleration, of the two piezoelectric vibrators is generated directly at the series node of the two piezoelectric vibrators, first and second phase-difference detecting circuits and a differential amplifier circuit of a dynamic-quantity sensor in Patent Document 1 are unnecessary. Since the two piezoelectric vibrators are used while being connected in series with each other, the combined impedance is increased, whereas the load of the oscillator circuit on the amplifier circuit is reduced, thereby reducing the size and power consumption.

The phase difference at the second end of the piezoelectric-vibrator series circuit with respect to the output portion of the amplifier circuit is about 45 degrees when $C2 \cdot R2 = 1/(2\pi f)$ and is greater than about 45 degrees when $C2 \cdot R2 > 1/(2\pi f)$ where C2 is the capacitance of the second capacitor connected between the second terminal of the piezoelectric-vibrator series circuit and the ground, is the resistance of the output-side resistor connected between the second terminal of the piezoelectric-vibrator series circuit and the output portion of the amplifier circuit, and f is the oscillation frequency of the oscillator circuit. Since the oscillation frequency f of the oscillator circuit is determined by the capacitances C1 and C2 and the inductance of the piezoelectric-vibrator series circuit between its anti-resonant frequency and resonant frequency, a wide dynamic range of changes in the phase difference in response to a dynamic quantity can be achieved by setting these values so as to satisfy $C2 \cdot R2 > 1/(2\pi f)$.

By connecting the series circuit including the input-side resistor and the third capacitor to the first capacitor, by setting the capacitances of C1 and C2 to be substantially equal to each other, and by setting the impedances of the output-side resistor and the input-side resistor to be substantially equal to each other, the phase difference between the output portion of the amplifier circuit and the series node of the piezoelectric-vibrator series circuit is adjusted. The voltage phase difference between output portions of the amplifier circuit when the dynamic quantity applied to the dynamic-quantity sensor is zero can be smoothed irrespective of the oscillation frequency, and noise generation due to variations in the oscillation frequency can be prevented. Thus, highly accurate dynamic-quantity measurement can be performed.

By connecting the series resistor in series with the first capacitor between the first end of the piezoelectric-vibrator series circuit and the ground, Q of a tank circuit including the piezoelectric-vibrator series circuit is limited. As a result, the sensitivity to a dynamic quantity is deteriorated. However, variations in the mechanical Q (Qm) of the piezoelectric-vibrator series circuit have a negligible effect, and the rate of change of sensitivity (the rate of change of phase difference between the output portions of the amplifier circuit due to variations in Qm) is reduced. Therefore, the temperature characteristics of the dynamic-quantity (e.g., acceleration) sensing sensitivity become stable, and aging is reduced.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

With reference to FIGS. 1 to 4 and 10 to 12, the configuration of a dynamic-quantity sensor according to a first preferred embodiment will be described.

Figure 1:
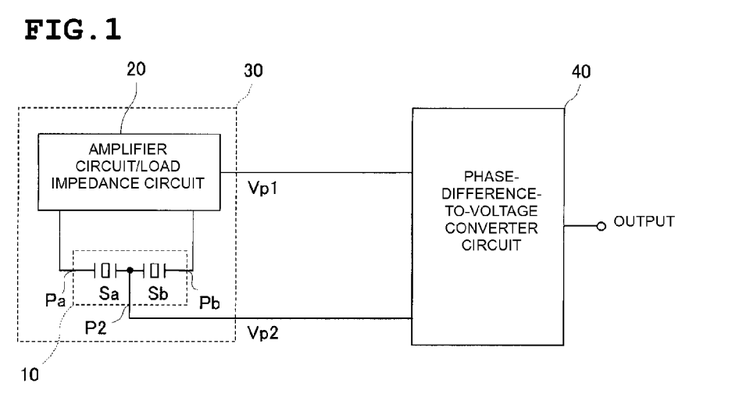
FIG. 1 is a block diagram of the overall configuration of a dynamic-quantity sensor according to a first preferred embodiment of the present invention.

FIG. 1 is a block diagram of a dynamic-quantity sensor. Two piezoelectric vibrators Sa and Sb are disposed so that stresses induced by a dynamic quantity are applied thereto in opposite directions. These two piezoelectric vibrators Sa and Sb are connected in series to define a piezoelectric-vibrator series circuit 10. The piezoelectric-vibrator series circuit 10 and an amplifier circuit/load impedance circuit 20 define a Colpitts oscillator circuit 30. A phase-difference-to-voltage converter circuit 40 detects a voltage phase difference between voltages Vp1 and Vp2 output from the oscillator circuit 30 as a voltage signal, which serves as an output signal of the dynamic-quantity sensor.

Figure 2A:
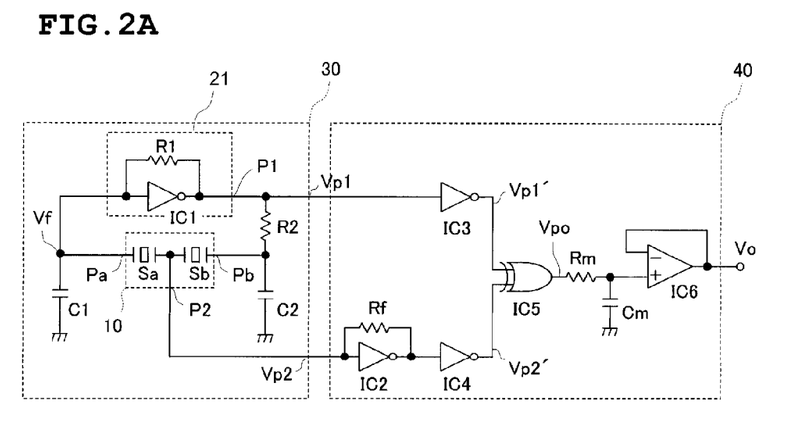
FIGS. 2A and 2B include circuit diagrams of the dynamic-quantity sensor.
Figure 2B:
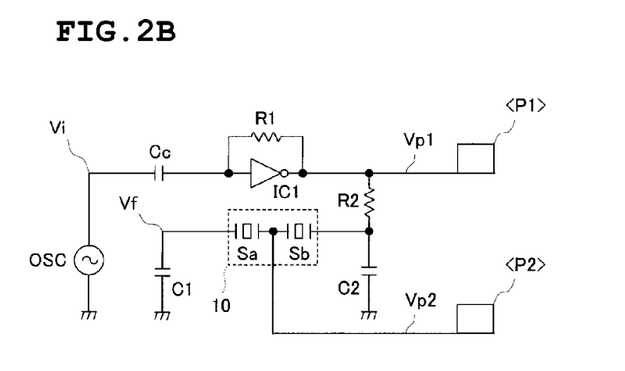

FIGS. 2A and 2B include specific circuit diagrams of the dynamic-quantity sensor shown in FIG. 1. In the oscillator circuit 30, an amplifier circuit 21 includes an inverting amplifier IC1 and a resistor R1 connected between an input and an output of the inverting amplifier IC1. A first capacitor C1 is connected between a first end Pa of the piezoelectric-vibrator series circuit 10 and ground, and a second capacitor C2 is connected between a second end Pb of the piezoelectric-vibrator series circuit 10 and the ground. An input portion of the amplifier circuit 21 is connected to the first end Pa of the piezoelectric-vibrator series circuit 10. An output-side resistor R2 is connected between an output portion P1 of the amplifier circuit 21 and the second end Pb of the piezoelectric-vibrator series circuit 10.

The oscillator circuit 30 includes the amplifier circuit 21, the piezoelectric-vibrator series circuit 10, and another circuit portion (load impedance circuit). The oscillator circuit 30 includes, in addition to the amplifier circuit 21 including the inverting amplifier IC1, a feedback circuit including a reactance circuit, and the oscillator circuit 30 is a Colpitts oscillator circuit that outputs an oscillation signal from the output portion P1 of the amplifier circuit 21. Since the piezoelectric-vibrator series circuit 10 is inductive between its anti-resonant frequency and resonant frequency, the oscillator circuit 30 oscillates at a frequency determined by the inductance of the piezoelectric-vibrator series circuit 10 and the capacitances of the capacitors C1 and C2. More specifically, the oscillation frequency f is:

$$f=1/[2\pi\sqrt{\{L \cdot C1 \cdot C2/(C1+C2)\}}]$$

where L is the inductance of the piezoelectric-vibrator series circuit 10 at frequencies at which the piezoelectric-vibrator series circuit 10 is inductive, and C1 and C2 represent the capacitances of the capacitors C1 and C2, respectively.

In the oscillator circuit 30, the output-side resistor R2 has a resistance of a few kΩ so as not to be influenced by a variation in the output impedance of the inverting amplifier IC1, and the product of the resistance of the output-side resistor R2 and the capacitance of the capacitor C2 is set to be at least about 10 times the value $1/(2\pi f)$ so that the voltage phase difference between P1 and P2 is about 90 degrees. If the product is $1/(2\pi f)$, the phase difference between Vp1 and Vp2 is about 45 degrees. Even when the phase difference between Vp1 and Vp2 is about 45 degrees, the phase-difference-to-voltage converter circuit 40 operates in a stable manner. However, since the phase-difference-to-voltage converter circuit 40 is designed to convert a phase difference of about 90 degrees into a voltage signal, the dynamic range of the phase-difference-to-voltage converter circuit 40 can be effectively used by setting in advance the phase difference between P1 and P2 to be in the vicinity of 90 degrees. As a result, the range in which a dynamic quantity can be sensed with a predetermined accuracy is increased.

The capacitances of the first capacitor C1 and the second capacitor C2 are approximately equal. The inverting amplifier IC1 includes a logic circuit inverter. The resistor R1 connected between input and output of the inverting amplifier IC1 has 1 MΩ. A method of connecting a resistor between input and output of a logic circuit inverter and using this as a linear amplifier has often been used in Colpitts oscillator circuits. Not only this method but other circuit construction methods for use in Colpitts oscillator circuits may be used in preferred embodiments of the present invention.

The phase-difference-to-voltage converter circuit 40 converts the phase difference between an output voltage Vp1 of the oscillator circuit 30 and a voltage Vp2 at a series node P2 of the piezoelectric-vibrator series circuit 10 into a voltage signal. An inverting amplifier IC2 and a feedback resistor Rf connected between an input and an output of the inverting amplifier IC2 define an amplifier circuit (preamplifier) having a predetermined gain. With this amplifier circuit, the level of a signal to be supplied to a subsequent stage is adjusted to the level of the output signal Vp1 at point P1 of the oscillator circuit 30. Inverters IC3 and IC4 amplify the voltage signal Vp1 and an output signal of the inverting amplifier IC2, respectively, to convert them into rectangular wave signals. More specifically, signals input to the inverters IC3 and IC4 are sine wave signals. By amplifying these input signals with a significantly large gain, the input signals are converted into rectangular wave signals having a low level and a high level of a logical signal.

An exclusive-OR gate IC5 performs an exclusive-OR operation of output signals of IC3 and IC4 to output a PWM (pulse-width modulation) signal Vpo. A resistor Rm and a capacitor Cm define a low-pass filter. This low-pass filter removes (smoothes) a fundamental wave frequency component of a rectangular wave signal output from IC5 and allows a signal component to pass through. A non-inverting amplifier circuit IC6 directly feeds back a signal at its output end to an inverting input end, thereby functioning as a voltage follower circuit. Accordingly, the non-inverting amplifier circuit IC6 can output a signal with a low output impedance without influencing an integrating circuit including the resistor Rm and the capacitor Cm. Also, the capacitance of the capacitor Cm is reduced. It is thus possible to embed the capacitor Cm in a semiconductor integrated circuit.

Next, the operation of the oscillator circuit 30 will be described with reference to FIG. 2B and FIGS. 3A-3C. FIG. 2B is a simulation circuit diagram of the oscillator circuit 30. A voltage Vi, which is an output signal of an oscillator OSC, is applied via a DC cut capacitor Cc so that no effect is applied on the bias of the inverting amplifier IC1. The capacitance of the DC cut capacitor Cc is set to a value (μF order) that is sufficiently greater than the capacitances of the capacitors C1 and C2. A simulation is performed by maintaining the voltage Vi constant and changing acceleration applied to the piezoelectric-vibrator series circuit 10 while sweeping the frequency of OSC.

Figure 3A:
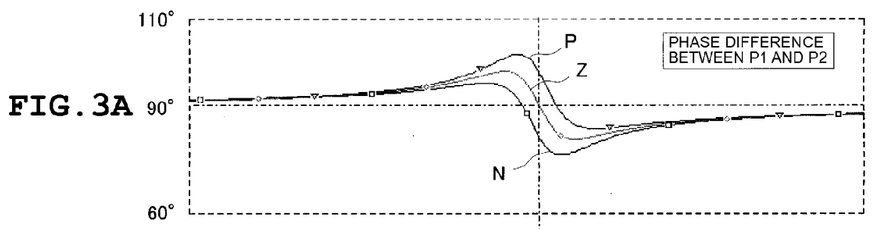
FIGS. 3A-3C include characteristic diagrams of an oscillator circuit of the dynamic-quantity sensor.
Figure 3B:
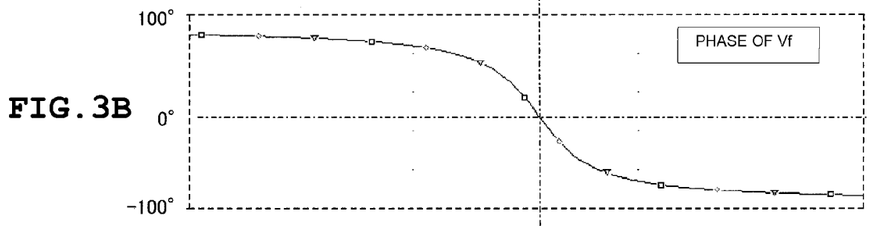
Figure 3C:
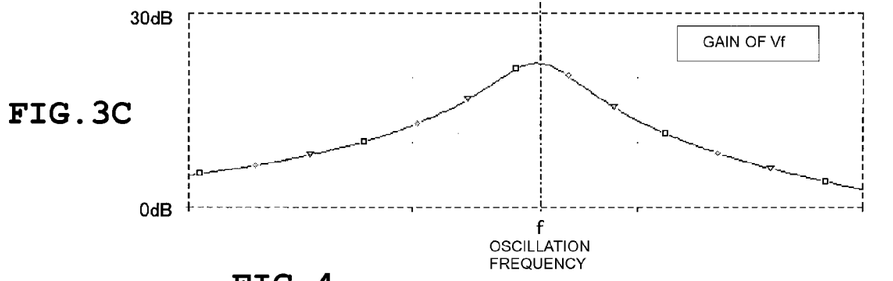

FIG. 3A shows the phase difference between terminals P1 and P2 shown in FIG. 2B, FIG. 3B shows the phase of voltage Vf of the capacitor C1, and FIG. 3C shows its gain.

In FIG. 3A, P represents characteristics when +100 G (1 G=9.80665 [M/s$^2$]) is applied, N represents characteristics when −100G is applied, and Z represents characteristics when no acceleration is applied. Since characteristics in three acceleration states overlap one another in FIGS. 3B and 3C, they appear to be one curve. The phase and gain of the feedback voltage Vf do not change, and the phase difference between Vp1 and Vp2 changes according to the level of acceleration at the oscillation frequency or its nearby frequencies.

Since the oscillator circuit 30 shown in FIG. 2A oscillates at a frequency at which the phase of the feedback voltage Vf becomes zero, it is clear that the applied acceleration can be measured by detecting the phase difference between Vp1 and Vp2 shown in FIG. 2A.

Figure 4:
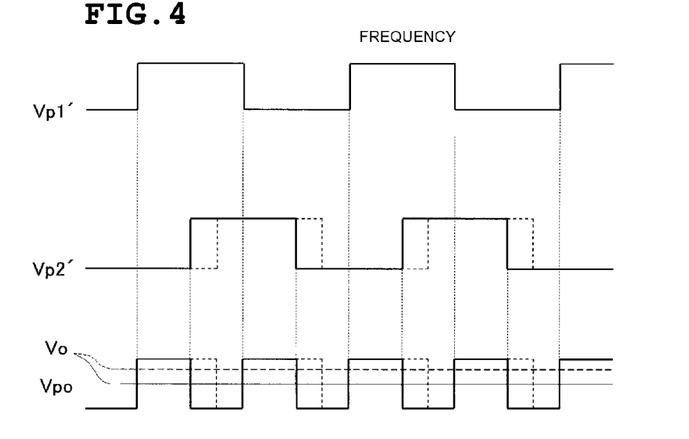
FIG. 4 is a waveform diagram showing the operation of a phase-difference-to-voltage converter circuit of the dynamic-quantity sensor.

FIG. 4 is a waveform diagram showing the operation of the phase-difference-to-voltage converter circuit 40 shown in FIG. 2A. The output signals of the inverters IC3 and IC4 are rectangular wave signals having the same cycle as the output signal of the oscillator circuit 30. The output signal Vpo of the exclusive-OR gate IC5 is a PWM signal in accordance with the phase difference between Vp1' and Vp2'. The on-duty ratio of Vpo changes according to the phase difference between Vp1' and Vp2', and a voltage signal Vo obtained as the result of integration using the low-pass filter is a voltage signal in proportion to the phase difference.

When the applied acceleration is 0 G, the phase difference between Vp1 and Vp2 at the oscillation frequency is about 90 degrees. Therefore, an inexpensive phase-difference-to-voltage converter circuit using an exclusive-OR gate, such as that shown in FIG. 2A, can be used, to thereby reduce the size and cost. By forming the exclusive-OR gate IC5 using a C-MOS circuit, the output voltage of the exclusive-OR gate IC5 when the applied acceleration is 0 G is half the power supply voltage. It thus is possible to improve matching with an analog circuit (voltage follower circuit including IC6 or the like) at a subsequent stage.

According to the dynamic-quantity sensor described above, the amplifier circuit and the load impedance circuit are connected to terminals other than the series node of the two piezoelectric vibrators to define the Colpitts oscillator circuit. The phase difference between the voltage at the series-node of the piezoelectric-vibrator series circuit and the oscillation output voltage is converted into a voltage signal. Therefore, the following advantages are achieved:

(a) An adder circuit (an averaging circuit using a voltage-dividing impedance) for controlling the oscillation frequency, which has been necessary in a known method, is unnecessary;

(b) Since a difference between characteristic voltages, induced by acceleration, of the two piezoelectric vibrators Sa and Sb is generated at the series node, a differential signal processing circuit is unnecessary, and the circuit scale is reduced by approximately half;

(c) Since the piezoelectric-vibrator series circuit is used, the impedance of the piezoelectric vibrator portion increases, and the load of the oscillator circuit on the amplifier is reduced to about ¼. Thus, an inexpensive amplifier can be used. In addition, since there is only a negligible variation in the characteristics of the amplifier due to heat generation, the temperature characteristics are satisfactory. A temperature compensation circuit is unnecessary, thereby further reducing the size and cost.

By setting the voltage phase difference between P1 and P2 of the oscillator circuit 30 to an initial phase difference, the following advantages are achieved:

(d) Variations in the output impedance of the amplifier circuit 21 have a negligible effect;

(e) The phase-difference-to-voltage converter circuit 40 can be provided using a low-cost circuit;

(f) A phase adjusting circuit, which has been required in the past is unnecessary in the phase-difference-to-voltage converter circuit 40. As a result, the size and cost of the phase-difference-to-voltage converter circuit 40 are reduced;

(g) By forming the exclusive-OR gate IC5 of the phase-difference-to-voltage converter circuit 40 using a C-MOS circuit that swings fully with respect to the power supply, matching with an analog circuit connected at a subsequent stage is improved, and an adjusting circuit is unnecessary. As a result, the size and cost are further reduced.

Although the exclusive-OR gate IC5 is preferably used in the phase-difference-to-voltage converter circuit 40 in the example shown in FIGS. 2A and 2B, an exclusive-NOR (EX-NOR) gate for outputting an inverted signal of an exclusive OR may also be used. Alternatively, a circuit for generating a PWM signal in accordance with the phase difference may be implemented using a combination of logical circuits, such as an AND gate, a NAND gate, an OR gate, a NOR gate, and the like.

Figure 11:
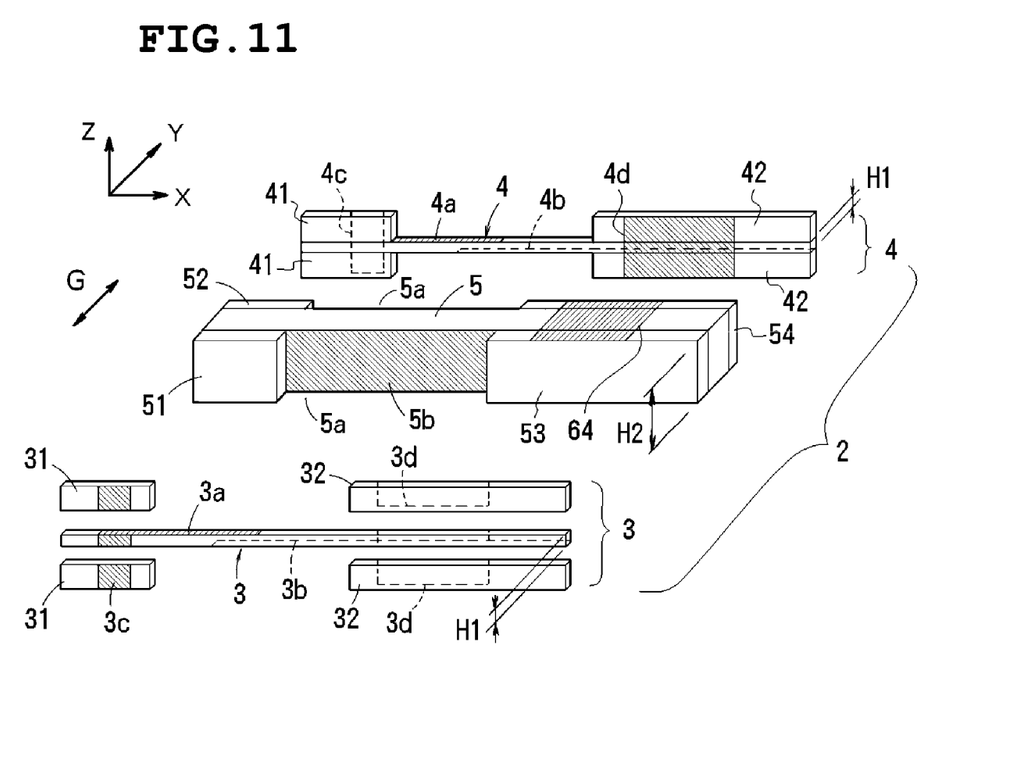
FIG. 11 is an exploded perspective view of an acceleration sensing element of the acceleration sensor.
Figure 12:
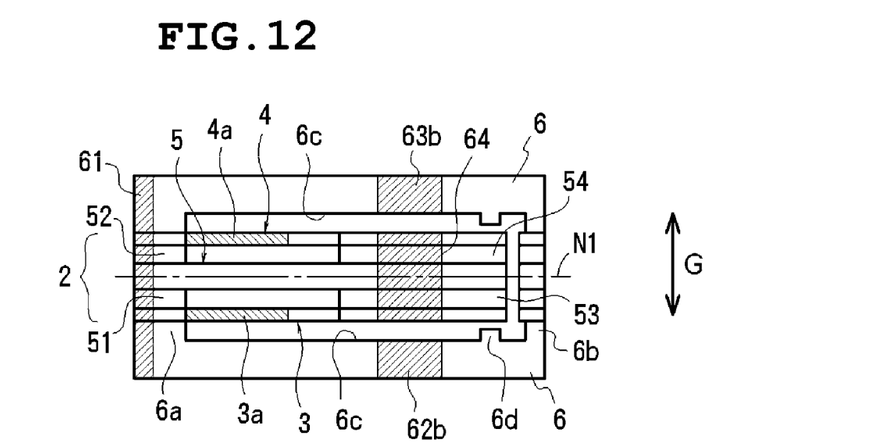
FIG. 12 is a plan view of the acceleration sensor from which covering members are removed.

An example of the configuration of the piezoelectric-vibrator series circuit 10 will be described on the basis of FIGS. 10 to 12.

Figure 10A:
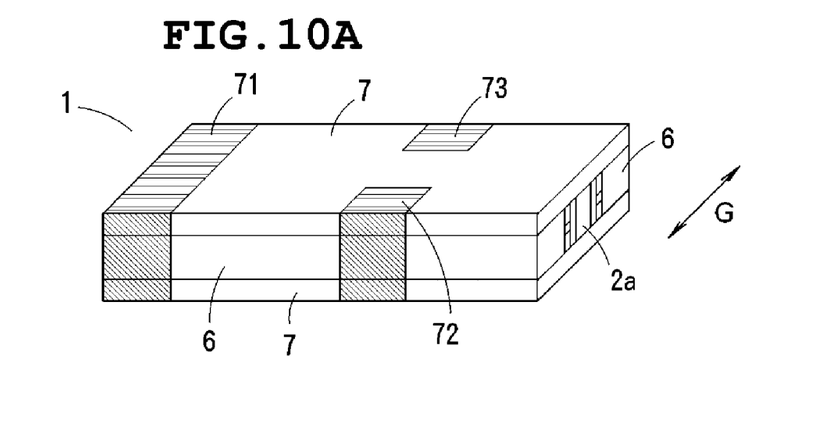
FIGS. 10A and 10B include an external perspective view and an exploded perspective view of an acceleration sensor included in a piezoelectric-vibrator series circuit.
Figure 10B:
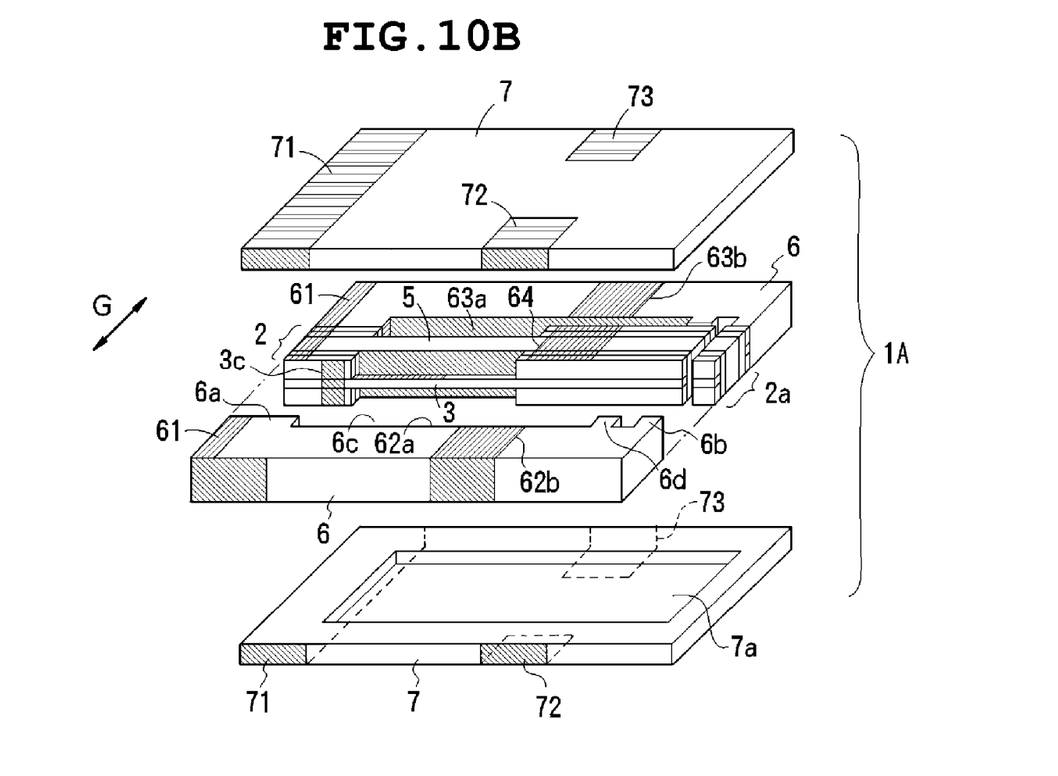

FIG. 10A is an external perspective view of an acceleration sensing element 1 included in the piezoelectric-vibrator series circuit 10, and FIG. 10B is an exploded perspective view of the same. FIG. 11 is an exploded perspective view of portion FIG. 10B. FIG. 12 is a plan view of the internal structure.

The acceleration sensing element 1 includes a bimorph piezoelectric vibrator 2 included and supported in a cantilever structure including insulating casing members 6 and covering members 7 made of an insulating ceramic or other suitable material. As shown in FIGS. 10A, 10B, and 11, where a Y direction is a direction in which acceleration G is applied, an X direction is the longitudinal direction of the piezoelectric vibrator 2, and a Z direction is the height direction of the piezoelectric vibrator 2.

The piezoelectric vibrator 2 is formed by bonding and integrating vibrators 3 and 4, using an adhesive, with both surfaces of a base plate 5 in the acceleration-applied direction (Y direction) and interposing therebetween spacers 51 to 54 at both end portions of both surfaces of the base plate 5.

The vibrators 3 and 4 are preferably energy-trap type vibrators vibrating in a thickness-shear vibration mode and are preferably fabricated by forming electrodes 3a, 3b, 4a, and 4b on the upper and lower principal surfaces of piezoelectric ceramic strips.

The first electrodes 3a and 4a of the vibrators 3 and 4 are exposed to the upper side of the piezoelectric vibrator 2, and the second electrodes 3b and 4b are exposed to the lower side of the piezoelectric vibrator 2. One end of each of the electrodes 3a and 3b and the electrodes 4a and 4b, which are disposed on the front and back principal surfaces, oppose each other at intermediate portions of the vibrators 3 and 4 in the longitudinal direction, and the other ends of the electrodes 3a, 3b, 4a, and 4b extend toward different ends of the vibrators 3 and 4. The heights H1 of the vibrators 3 and 4 in the Z direction are the same dimensions, and the heights H1 are determined by the resonant frequency of the vibrators 3 and 4. Since the heights H1 of the vibrators 3 and 4 are less than the height H2 of the base plate 5 in the Z direction, stresses induced by application of acceleration on the vibrators 3 and 4 are increased as compared to when H1=H2. In this example, H1 is set to be less than or equal to about ⅕ of H2.

Spacers 31, 32, 41, and 42 having the same thickness as the vibrators 3 and 4 are fixed at both ends of the vibrators 3 and 4 in the longitudinal direction on the upper and lower principal surfaces. Portions (energy trap portions) where the electrodes 3a and 3b and the electrodes 4a and 4b oppose each other are portions where the spacers 31, 32, 41, and 42 are not fixed.

The vibrators 3 and 4 are bonded at opposing locations on both surfaces of the base plate 5. In this manner, the same stress is applied to the two vibrators due to deflections in another axis, thereby reducing sensing variations. Also, the vibrators 3 and 4 are bonded at the center of the total height of the base plate 5. Thus, when the piezoelectric vibrator is deflected by an external force in a direction other than that in which acceleration is applied (deflection in another axis), sensing variations due to the deflection in another axis are absorbed by obtaining a differential signal from the two vibrators 3 and 4.

The base plate 5 is an insulating plate having the same length as the vibrators 3 and 4. The central bending plane (indicated by broken lines N1 in FIG. 12) of the piezoelectric vibrator 2 in response to application of acceleration G is located at the approximate center of the base plate 5 in the thickness direction (Y direction). Gaps 5a that are greater than the energy trap ranges of the vibrators 3 and 4 are disposed on the surfaces of the base plate 5 opposing the vibrators 3 and 4.

The spacers 51 and 52 disposed on a base-end side have the same length as the spacers 31 and 41 disposed on the base-end side of the vibrators 3 and 4, and the spacers 51 and 52 have the same height (Z direction) as the height H2 of the base plate 5. Similarly, the spacers 53 and 54 disposed on a free-end side have the same length as the spacers 32 and 42 disposed on the free end of the vibrators 3 and 4, and the spacers 53 and 54 have the same height (Z direction) as the height H2 of the base plate 5.

The vibrators 3 and 4, the spacers 31, 32, 41, and 42, the base plate 5, and the spacers 51 to 54 included in the piezoelectric vibrator 2 are fabricated such that they are made of a material (e.g., ceramic such as PZT) having the same thermal expansion coefficient as the vibrators 3 and 4. Therefore, stress induced by a thermal expansion difference due to a temperature change is prevented from being applied to the vibrators 3 and 4.

An extraction electrode 5b is provided on substantially the entirety of one side of the base plate 5 onto which the spacers 51 and 53 are bonded. The extraction electrode 5b is electrically connected to an internal electrode 61 continuously provided on the upper surface of the base end portion of the piezoelectric vibrator 2 including the vibrators 3 and 4. An internal electrode 64 is continuously formed on the upper surface of the base plate 5 on the free-end side and on the upper surfaces of the spacers 53, 54, 32, and 42. The internal electrode 64 enables the extraction electrode 5b disposed on one side of the base plate 5 to be electrically connected to connection electrodes 3d and 4d provided on the side of the vibrators 3 and 4.

Both sides of the piezoelectric vibrator 2 in the direction in which acceleration G is applied are covered with a pair of the left and right casing members 6. The casing members 6 are substantially U-shaped in cross-section. Protrusions 6a at one end of the casing members 6 are fixed to both sides of the base end portion of the piezoelectric vibrator 2. Protrusions 6b at the other end of the casing members 6 are fixed in place with a spacer member 2a interposed therebetween. The spacer member 2a is a fragment of the longitudinally-continuous piezoelectric vibrator 2, which is obtained by cutting off a tip of the piezoelectric vibrator 2. The spacer member 2a includes a portion of the base plate 5, the vibrators 3 and 4, and the spacers 53 and 54. Depressions 6c are provided between the protrusions 6a and 6b so as to leave a space for the piezoelectric vibrator 2 to deflect. Stoppers 6d for preventing deformation or breakage of the piezoelectric vibrator 2 by limiting displacement of the piezoelectric vibrator 2 due to application of excessive acceleration G are disposed on the inner side of the protrusions 6b at the other end of the casing members 6.

Extraction electrodes 62a and 62b and extraction electrodes 63a and 63b, which are electrically connected with each other, are provided on the inner wall and the upper surface of the casing members 6. The casing members 6 are bonded to the piezoelectric vibrator 2 with an electroconductive adhesive in order to establish an electrical connection between the electrodes 3c and 62a and an electrical connection between the electrodes 4c and 63a. In order to prevent short-circuiting between the internal electrode 61, which is continuously formed on the upper surface of the casing members 6 and the base end portion of the piezoelectric vibrator 2, and an external electrode 71, an anisotropic conductive adhesive is preferably used.

The extraction electrodes 62b and 63b disposed on the upper surface of the casing members 6 and the internal electrode 64 disposed on the upper surface of the piezoelectric vibrator 2 on the free-end side are arranged on a straight line. After the casing members 6 are bonded to the piezoelectric vibrator 2, the electrodes 62b, 63b, and 64 are formed at the same time by performing sputtering or vapor deposition on the upper surface thereof. The internal electrode 61 is also formed at the same time.

The upper and lower open sides formed by the piezoelectric vibrator 2 and the casing members 6 are covered with a pair of the upper and lower covering members 7. Inside the covering members 7, hole-forming depressions 7a are formed to prevent contact with the piezoelectric vibrator 2. The periphery of the hole-forming depressions 7a is fixed to the open sides. Accordingly, a displacement portion of the piezoelectric vibrator 2 induced by acceleration G is completely sealed in the casing members 6 and the covering members 7.

On the outer surface of each covering member 7, an external electrode 71 arranged on the base-end side of the piezoelectric vibrator 2 and two external electrodes 72 and 73 arranged on the free-end side of the piezoelectric vibrator 2 are formed. As shown in FIGS. 10A and 10B, the external electrodes 72 and 73 are disposed at locations that are separated from the external electrode 71 in the longitudinal direction (X direction). The external electrodes 72 and 73 are disposed on two opposing sides in the acceleration-applied direction (Y direction).

A conduction path of the piezoelectric vibrator 2 with the above-described configuration is as follows.

The upper electrode 3a of the vibrator 3 is electrically connected to the external electrode 72 via the connection electrode 3c and the extraction electrodes 62a and 62b. The upper electrode 4a of the other vibrator 4 is electrically connected to the external electrode 73 via the connection electrode 4c and the extraction electrodes 63a and 63b. The lower electrodes 3b and 4b of the vibrators 3 and 4 are connected to each other via the connection electrodes 3d and 4d and the internal electrode 64 and are connected to the external electrode 71 via the extraction electrode 5b formed on one side of the base plate 5 and the internal electrode 61.

In this manner, the surface-mounted chip acceleration sensing element 1 is formed.

Next, a dynamic-quantity sensor according to a second preferred embodiment is described with reference to FIGS. 5A to 6C.

Figure 5A:
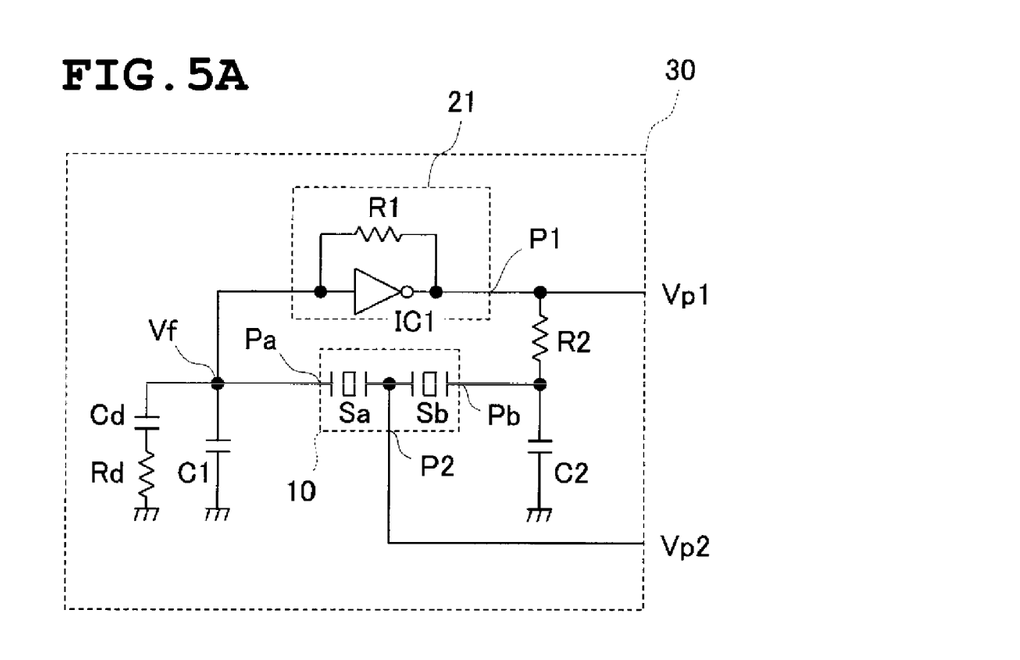
FIGS. 5A and 5B include diagrams of the configuration of an oscillator circuit portion of a dynamic-quantity sensor according to a second preferred embodiment of the present invention.

FIG. 5A shows the configuration of an oscillator circuit 30. Unlike the oscillator circuit 30 shown in FIG. 2A, the oscillator circuit 30 shown in FIG. 5A includes a series circuit including an input-side resistor Rd and a third capacitor Cd, which is connected in parallel with a capacitor C1. The third capacitor Cd is provided to cut off a DC component of an inverting amplifier IC1, and the impedance at oscillation frequency is set to a sufficiently small value (less than or equal to about 1/10) as compared to the resistance of the input-side resistor Rd. The remaining portions are similar to those of the first preferred embodiment.

Figure 5B:
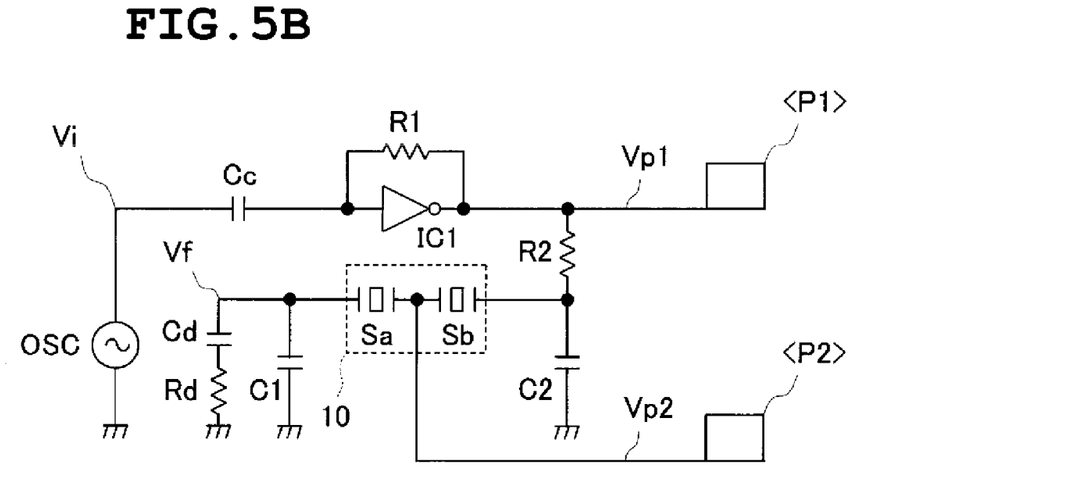

FIG. 5B shows a simulation circuit of the oscillator circuit 30. As in the first preferred embodiment, a voltage Vi is applied from an oscillator OSC to the inverting amplifier IC1 via a DC cut capacitor Cc.

Figure 6A:
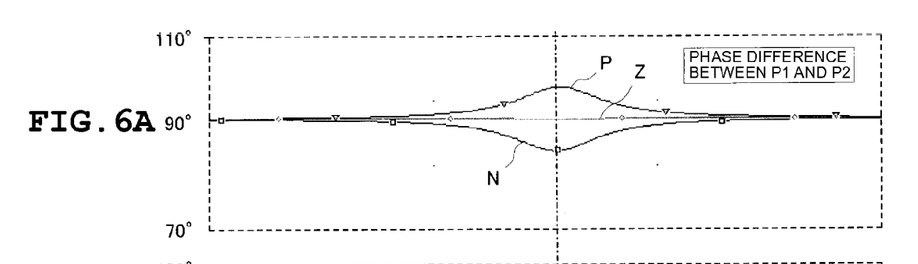
FIGS. 6A-6C include characteristic diagrams of the oscillator circuit.
Figure 6B:
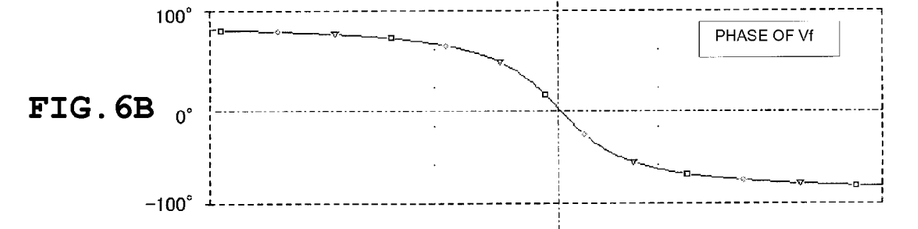
Figure 6C:
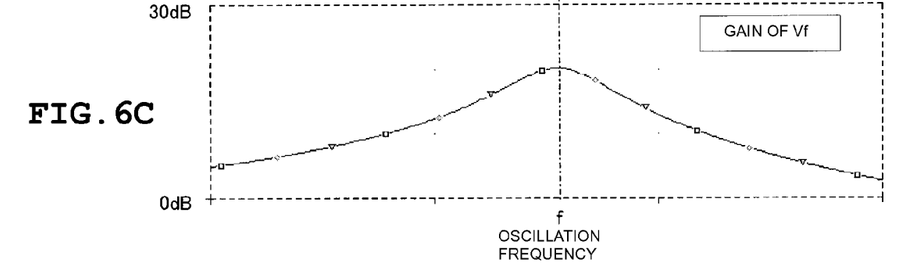

FIG. 6A shows the phase difference between terminals P1 and P2 shown in FIG. 5A, FIG. 6B shows the phase of voltage Vf of the capacitor C1, and FIG. 6C shows its gain. In FIG. 6, P represents characteristics when +100 G (1 G=9.80665 [m/s$^2$]) is applied, N represents characteristics when −100 G is applied, and Z represents characteristics when no acceleration is applied. Since characteristics in three acceleration states overlap one another in FIG. 6B and 6C, they appear to be one curve. As in the first preferred embodiment, the phase and gain of the feedback voltage Vf are not influenced by application of acceleration, and the phase difference between Vp1 and Vp2 changes according to the level of acceleration at the oscillation frequency or its nearby frequencies.

Unlike the first preferred embodiment, in this example, the phase of the feedback voltage Vf is adjusted using the capacitances of the capacitors C1, C2, and Cd and the resistance of the resistor Rd shown in FIG. 5 so that the phase difference between Vp1 and Vp2 becomes smooth, regardless of the frequency, in a state where no acceleration is applied (applied acceleration is 0 G). A change in the phase difference is symmetrical with respect to a change in frequency upon application of acceleration.

With such characteristics, even when the oscillation frequency changes, noise is not generated. Therefore, more accurate measurement can be performed.

Next, a dynamic-quantity sensor according to a third preferred embodiment is described with reference to FIGS. 7 and 8.

Figure 7:
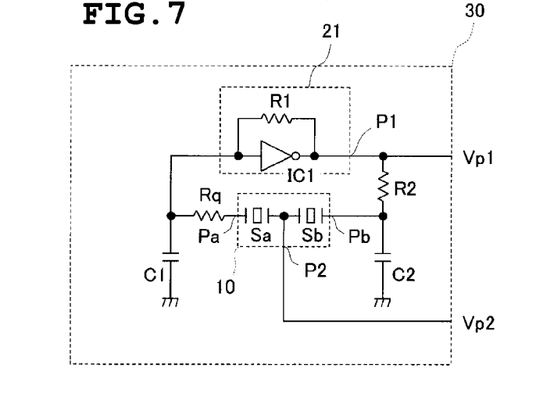
FIG. 7 is a diagram of the configuration of an oscillator circuit portion of a dynamic-quantity sensor according to a third preferred embodiment of the present invention.

FIG. 7 shows an oscillator circuit 30. Unlike the oscillator circuit 30 of the dynamic-quantity sensor shown in FIGS. 2A and 2B, the oscillator circuit 30 shown in FIG. 7 includes a series resistor Rq disposed in series with a first capacitor C1 between a first end Pa of a piezoelectric-vibrator series circuit 10 and ground. With the series resistor Rq disposed in this manner, Q of a tank circuit including the piezoelectric-vibrator series circuit 10 and the capacitors C1 and C2 is deteriorated, and the sensitivity to a dynamic quantity is reduced. However, variations in the mechanical Q (Qm) of the piezoelectric-vibrator series circuit 10 have a negligible effect, and the rate of change of sensitivity (the rate of change of phase difference between Vp1 and Vp2) due to variations in Qm is reduced. Therefore, the temperature characteristics of the dynamic-quantity (e.g., acceleration) sensing sensitivity are stable, and deterioration with age is reduced.

Figure 8:
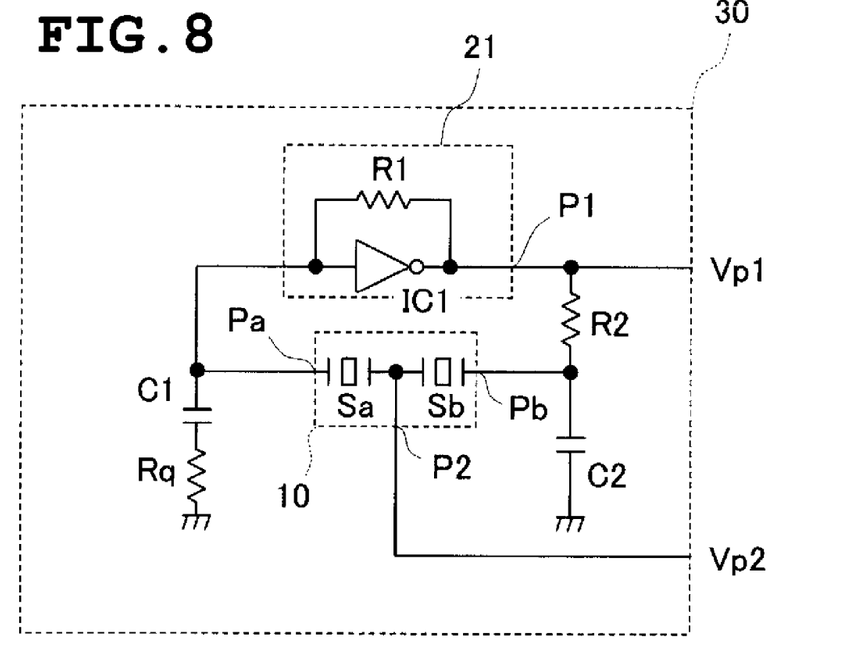
FIG. 8 is a diagram of the configuration of an oscillator circuit portion of another dynamic-quantity sensor according to the third preferred embodiment of the present invention.

FIG. 8 shows another configuration of the oscillator circuit 30. As shown in FIG. 8, the series resistor Rq may be disposed in series with the capacitor C1 between an input portion of an amplifier circuit 21 and the ground. Similar advantages can also be achieved with this configuration. In this case, the same advantages can be achieved by replacing C1 and Rq with each other.

Figure 9:
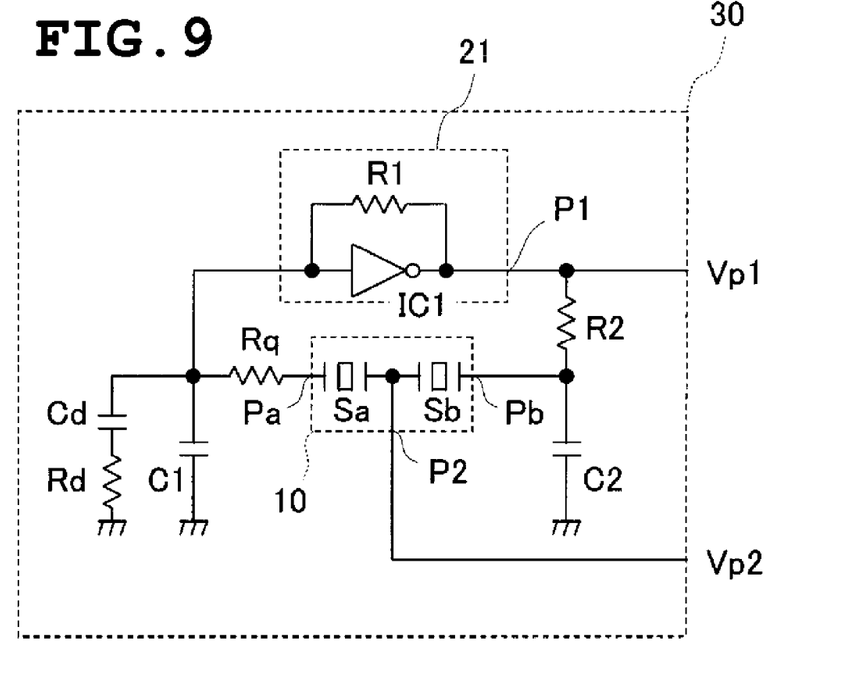
FIG. 9 is a diagram of the configuration of an oscillator circuit portion of a dynamic-quantity sensor according to a fourth preferred embodiment of the present invention.

FIG. 9 shows the configuration of an oscillator circuit 30 of a dynamic-quantity sensor according to a fourth preferred embodiment. The oscillator circuit includes both the configuration shown in FIGS. 5A and 5B according to the second preferred embodiment and the configuration shown in FIG. 7 according to the third preferred embodiment. That is, a series circuit including an input-side resistor Rd and a third capacitor Cd is connected in parallel with a capacitor C1. A series resistor Rq is disposed in series with the first capacitor C1 between a first end Pa of a piezoelectric-vibrator series circuit 10 and ground.

With this configuration, the phase difference between outputs Vp1 and Vp2 of the oscillator circuit 30 when no acceleration is applied on the piezoelectric-vibrator series circuit 10 becomes independent of oscillation frequency, and noise caused by a change in the oscillation frequency does not occur. With the series resistor Rq disposed in this manner, the temperature characteristics of the dynamic-quantity (e.g., acceleration) sensing sensitivity are stable, and deterioration with age is reduced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A dynamic-quantity sensor comprising:
   a piezoelectric-vibrator series circuit including two piezoelectric vibrators to which stresses induced by a dynamic quantity are applied in opposite directions;
   a Colpitts oscillator circuit including an amplifier circuit and a load impedance circuit connected to the piezoelectric-vibrator series circuit; and
   a phase-difference-to-voltage converter circuit arranged to convert a phase difference between a voltage at a series node between the two piezoelectric vibrators of the piezoelectric-vibrator series circuit and an output voltage of the oscillator circuit into a voltage; wherein
   the oscillator circuit includes a first capacitor connected between a first end of the piezoelectric-vibrator series circuit and a ground, a second capacitor connected between a second end of the piezoelectric-vibrator series circuit and the ground, an input portion of the amplifier circuit connected to the first end of the piezoelectric-vibrator series circuit, and an output-side resistor connected between an output portion of the amplifier circuit and the second end of the piezoelectric-vibrator series circuit; and
   an impedance of the output-side resistor is greater than an output impedance of the amplifier circuit, and the impedance of the output-side resistor and a capacitance of the second capacitor are set such that the product of the impedance of the output-side resistor and the capacitance of the second capacitor is greater than a value $1/(2\pi f)$, where f is an oscillation frequency of the oscillator circuit.

2. The dynamic-quantity sensor according to claim 1, wherein a series circuit including an input-side resistor and a third capacitor is connected in parallel with the first capacitor, the capacitances of the first and second capacitors are substantially equal to each other, and the impedances of the output-side resistor and the input-side resistor are substantially equal to each other.

3. The dynamic-quantity sensor according to claim 1, wherein a series resistor is disposed in series with the first capacitor between the first end of the piezoelectric-vibrator series circuit and the ground.

4. The dynamic-quantity sensor according to claim 1, wherein the dynamic quantity is acceleration.

5. The dynamic-quantity sensor according to claim 1, wherein the dynamic quantity is angular acceleration.

6. The dynamic-quantity sensor according to claim 1, wherein the dynamic quantity is angular velocity.

7. The dynamic-quantity sensor according to claim 1, wherein the dynamic quantity is a load.

* * * * *